Sept. 17, 1940.  L. E. WELLS  2,214,803
VENT CHAMBER FOR STORAGE BATTERIES
Filed April 8, 1938

INVENTOR.
LELAND E. WELLS
BY
Kwis Hudson & Kent
ATTORNEYS

Patented Sept. 17, 1940

2,214,803

UNITED STATES PATENT OFFICE 2,214,803

VENT CHAMBER FOR STORAGE BATTERIES

Leland E. Wells, Cleveland Heights, Ohio, assignor to Willard Storage Battery Company, Cleveland, Ohio, a corporation of West Virginia Application April 8, 1938, Serial No. 200,941

1 Claim. (Cl. 136—177)

This invention relates to vent chambers for storage batteries and has for its chief object to provide a novel form of baffle or diaphragm for use in a battery vent chamber, such as the cavity or chamber in the vent plug.

More particularly it is the aim of the invention to provide a baffle or diaphragm which is more efficient than those heretofore employed in preventing or reducing the loss of electrolyte in the form of spray or gas bubbles during the periods that the battery is on charge.

Still further the invention aims to provide a baffle or diaphragm which is formed separately from the body of the vent chamber in a manner such that one or more of them can be easily inserted in the chamber and assume the desired shape and position quickly and without any considerable labor expense.

The invention may be briefly summarized as consisting in certain novel details of construction and combinations and arrangements of parts which will be described in the specification and set forth in the appended claim.

Figure 1:
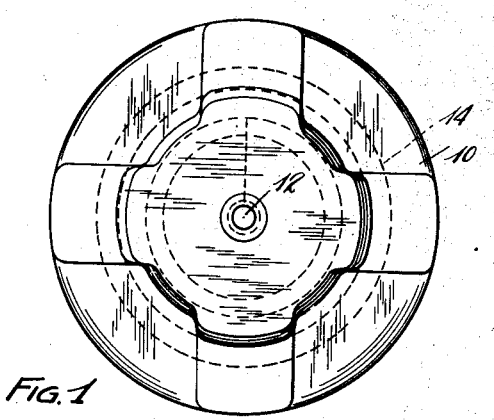
Fig. 1 is a top plan view of a battery vent plug equipped with baffles formed in accordance with my invention, this view and the subsequent views showing the vent plug and the parts thereof on an enlarged scale.
Figure 5:
Fig. 5 is an edge view and Fig. 6 is a plan view of the flat disk which is utilized in forming one of the baffles.

At the present time the "under-the-hood" installation of storage batteries by automobile manufacturers is becoming continuously more popular and this location of the battery makes it vitally important that the loss of electrolyte through the vent plug be prevented if possible and calls for special and improved venting means to attain this end. The construction described below and constituting the subject of this invention answers this requirement very effectively without adding to the cost of the vent plug and therefore of the battery, it being understood that one of these vent plugs will be employed with each cell of the battery and is designed to be screwed into the interiorly threaded flanged opening of the cover in the customary manner.

The vent plug comprises an inverted cup-shaped body 10 which can be formed by a simple molding operation from any of the materials customarily employed, such as hard rubber or other suitable plastic composition. Preferably the body 10 has an integral top portion 11 which is closed except for a vent opening 12. As the body 10 is molded, it is provided with an inner cavity 13 which extends from the top 11 to the open bottom of the body without any integral transverse baffle walls which would add to the molding cost, the cavity being progressively larger from the top 11 to its lower open end. The lower exterior part of the body is provided with a thread 14 by which the vent plug may be screwed into the interiorly threaded opening in the cover and, as here shown, above the threaded portion is a flange 15 designed to engage a suitable gasket placed on the cover around the vent plug opening thereof. However, the details of the plug, particularly so far as its external shape is concerned, are immaterial to the present invention.

In the construction illustrated, the plug is provided on its interior with two vertically spaced novelly formed transverse baffles 16 which divide the inner chamber or cavity 13 into three separate compartments. While I am aware of the fact that it is not new with me to provide a baffle on the interior of a vent plug, in view of the novel construction of my baffle I regard it within the scope of my invention to provide the vent plug with a single baffle or to provide more than two spaced baffles on the interior of the plug if a plurality is desired. However, at the present time I believe that two baffles are sufficient. These baffles 16 are in the shape of inverted cones and each is provided with an opening 17 at the apex of the cone or at the lower central part thereof for venting purposes and for the return of the electrolyte condensed from spray or otherwise caught in the compartment above the baffle. The baffles are held frictionally in place by having their peripheral portions engaged in annular grooves 18 molded or otherwise formed in the interior wall of the cavity 13.

Figure 6:
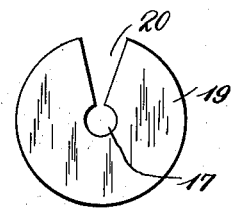
Figure 2:
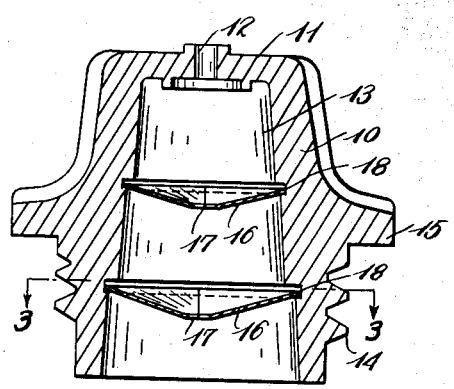
Fig. 2 is a vertical sectional view of the vent plug.
Figure 7:
Fig. 7 is a sectional view of the same showing the form to which the disk is pressed when inserted in the body of the vent plug from the bottom thereof.
Figure 3:
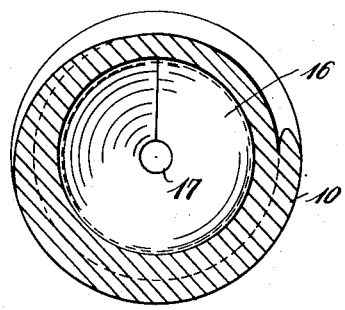
Fig. 3 is a transverse sectional view substantially along the line 3—3 of Fig. 2.
Figure 4:
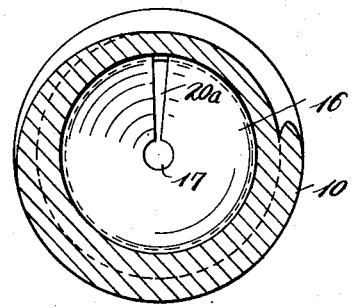
Fig. 4 is a similar view showing a slight modification.

These baffles are formed of suitable flexible material such as hard rubber or other equivalent durable material inert to the electrolyte. Initially the baffles are in the form of flat disks 19 which may be cut or stamped from flat sheeted material such as vulcanized sheet rubber. The flat disk 19 is circular in outline, but, in accordance with the present invention, to enable it to be given the desired conical pitch and to facilitate its insertion into the vent plug body, the disk, when cut from the sheet material, is provided with a sector-shaped notch 20 extending from the periphery to the central opening 17, as clearly shown in Fig. 6. With this construction the disk 19 can be readily bent into the shape of the conical baffle 16 having a decided pitch as illustrated, without danger of breakage of the disk, and when bent or deflected to this form they can be quickly and easily slid into the cavity 13 of the vent plug and allowed to snap into the annular grooves 18 and are thus permanently retained in position by the frictional and interlocking engagement with the wall of the cavity. The upper baffle, being held in a narrower part of the cavity than the lower baffle, is formed from a flat disk 19 cut on a slightly smaller radius than the disk from which the lower baffle is formed. The sizes of the disks 19 are so selected with respect to the diameters of the grooves 18 that when the baffles are in place the sector-shaped notches 20 are preferably closed, as indicated in Figs. 2, 3, and 7, each disk being of such size with reference to the groove 18 which is to receive its periphery that when it snaps into the groove 18 it does not expand or flatten sufficiently to partly open the sector. This is the preferred construction as it then confines whatever venting occurs to the central opening 17 provided for this purpose. However, I do not regard this feature as absolutely essential to the invention for a slight opening of the sector-shaped notch, as indicated at 20a in Fig. 4, would not destroy the utility of the device even though it would render it less effective than is the case when the notch is closed when the baffle is in place, as shown in Fig. 3.

It will be understood, of course, that as the spray or gas bubbles pass up into the lower part of the cavity 13 some of it will contact with the bottom of the lower baffle 16 and become condensed and eventually drop back into the battery. Part of it will pass through the opening 17 in the lower baffle and will contact with the lower surface of the upper baffle 16 or on the walls of the middle chamber or compartment where it will condense and drop back onto the lower baffle 16 and then pass through the central opening 17 thereof into the battery. If any passes through the opening 17 of the upper baffle, it will entirely or substantially entirely condense against the walls of the upper chamber of the cavity and be condensed and eventually run down onto the upper baffle 16 and then find its way back into the battery.

While I have shown the preferred construction, I do not desire to be confined to the precise details shown but aim in my claim to cover all modifications which do not involve a departure from the spirit and scope of my invention.

Having thus described my invention, I claim:

A device for use as a baffle in a vent chamber of a storage battery comprising a thin flat disk of flexible material inert to battery electrolyte, said disk having a central opening and a slot extending from said opening to the periphery of the disk and gradually widening from its inner to its outer end, said disk being adapted to be flexed to conical shape and to be retained in the cavity of the chamber as an inverted cone with the edge of the disk engaging the wall of the cavity, the diameter of the disk and the angle of the notch being so selected with respect to the diameter of that part of the cavity which the edge of the disk is adapted to engage that when the disk is in place in the chamber the notch of the disk is substantially closed or entirely closed by the engagement of the two edges of the notch.

LELAND E. WELLS.